Feb. 17, 1970

I. R. BARR 3,495,672

DUAL-WHEELED UNIT INDEPENDENT SUSPENSION
FOR CROSS-COUNTRY VEHICLE

Filed May 3, 1967

Irwin R. Barr
INVENTOR.

BY

ATTORNEY

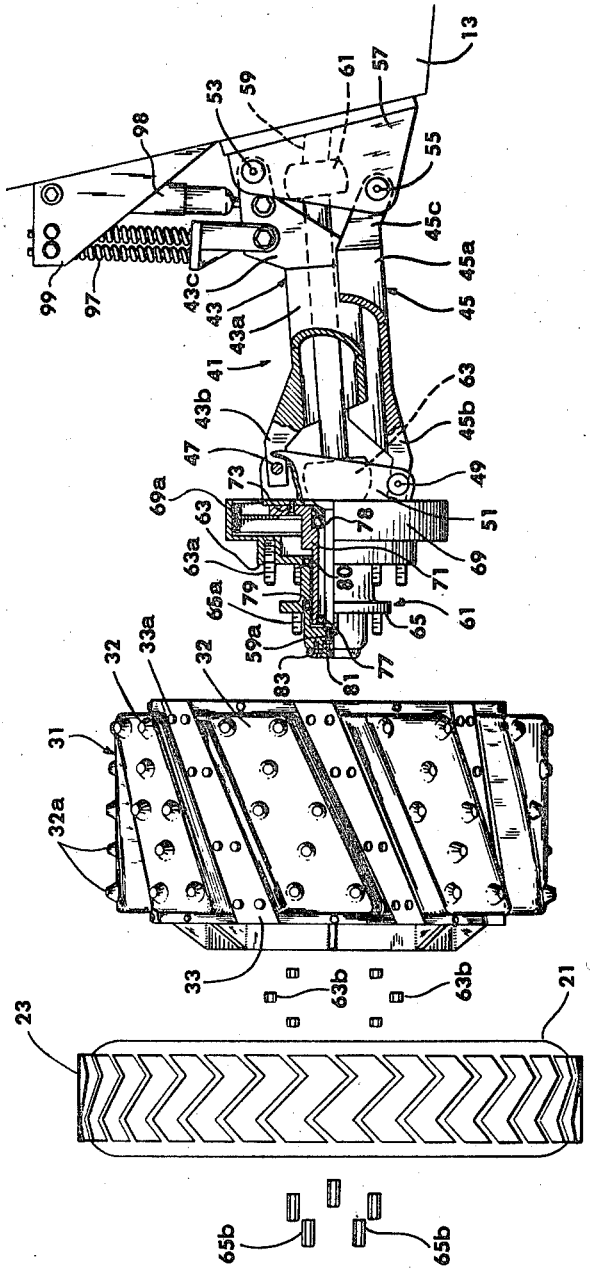

Irwin R. Barr
INVENTOR.

ATTORNEY

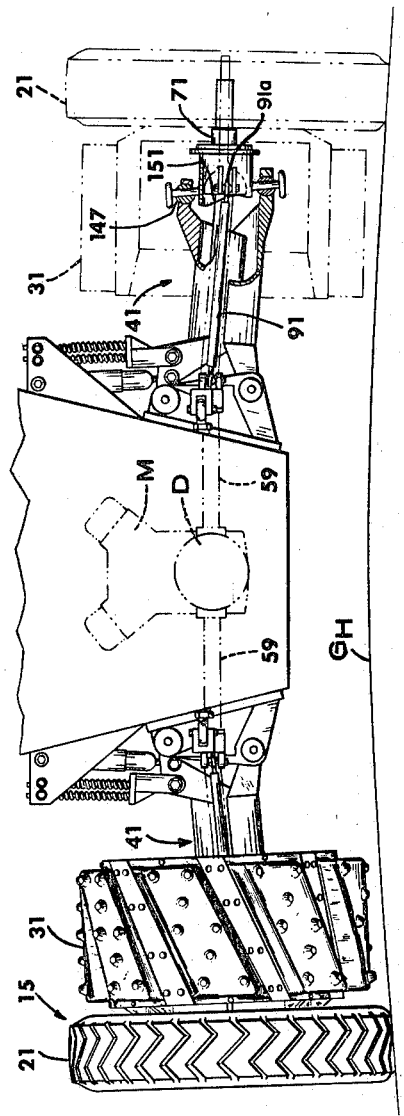
Fig. 6
Irwin R. Barr
INVENTOR.
ATTORNEY

United States Patent Office 3,495,672
Patented Feb. 17, 1970

3,495,672
DUAL-WHEELED UNIT INDEPENDENT SUSPENSION FOR CROSS-COUNTRY VEHICLE
Irwin R. Barr, Lutherville, Md., assignor to AAI Corporation, Cockeysville, Md., a corporation of Maryland
Filed May 3, 1967, Ser. No. 635,733
Int. Cl. B62d 7/00, 3/00; B60b 11/00
U.S. Cl. 180—48                             13 Claims

ABSTRACT OF THE DISCLOSURE

A combined highway and cross-country vehicle arrangement is disclosed, employing a plurality of dual-wheeled wheel units. Each of the wheel units includes a large diameter axially outer wheel with a pneumatic tire of relatively narrow tread width for highway engagement at high speeds, and an inboard smaller diameter wider tread width wheel having deep canted lugs disposed on its peripheral ground-engaging surface. The larger diameter outer tires are employed for normal highway travel, and enable facile high speed operation, and the inner smaller diameter wider tread width deep lugged wheels are maintained off the highway, both during straight and turning vehicle travel, by canting the wheel units at a positive camber angle with respect to the horizontal, and maintaining a positive camber angle through utilization of a cantilevered parallelogram linkage suspension which is disposed within and enveloped by the inboard smaller diameter wheel, which is itself hollow and open on its inner face for this purpose, as well as for purposes of lightness. The vehicle may travel over soft terrain, in which case the inboard wheels engage the ground and become main propulsion units through utilization of the deep canted lugs.

---

Off road vehicles have used large diameter wheels with pneumatic tires or small diameter inflated rollers (i.e. pneumatic tires having a relatively large width for a given diameter). Neither of these systems is fully suitable for multipurpose vehicle operation, where high road speed is desired, as well as good cross-country mobility. Wide pneumatic roller type tires are vulnerable to bullets in the event the vehicle is used for warfare, and if foam-filled, the tires heat too much for high speed operation. Also, such wide pneumatic roller type tires do not normally allow sufficient internal room for a suspension system, and cannot be cantilevered from the side of the vehicle conveniently. Thus, a vehicle employing such roller type tires normally must employ both inboard and outboard wheel supports, which are cumbersome, space-consuming, weight additive, and vulnerable to external damage, particularly from gunfire. Larger diameter wheels are heavy, vulnerable to gunfire, and are difficult to fit into military armored vehicle configurations.

It is accordingly a major feature and advantage of this invention to provide a cross-country and highway vehicle having an improved vehicle wheel and wheel suspension arrangement which will enable high road speed capability, with good cross-country mobility, while providing a wheel arrangement which has relatively low vulnerability to gunfire and explosive fragments.

It is a further feature to provide a wheel arrangement which enables safe vehicle operation in the event of damage to the normal road wheel or tire.

It is still a further feature of the invention to provide a wheel arrangement and associated suspension which will permit necessary deflections of the wheel units, while maintaining sufficient camber angle to prevent engagement of the off road wheel with the crown of a road, during both straight and turning vehicle travel.

Still a further feature of the invention is to provide a wheel and wheel suspension arrangement in which the wheel suspension is disposed within and enveloped by the basic envelope of the wheel unit, and the wheel unit being also arranged for utilization of a steering system in which the tie rod may be largely disposed within the same basic envelope, thus allowing the drive shaft and suspension linkage to be protected and surrounded by the basic envelope of the wheel unit, and particularly the basic envelope of an off-road smaller diameter wheel. This feature also holds the further advantage of reducing the spatial requirements for the wheel units and suspensions therefor, thereby enabling the employment of a wide wheel unit without increasing vehicle width, while at the same time providing for large vertical travel of the wheel units and small turning radius with the driven wheels.

Still other objects, features and attendant advantages will become apparent to those skilled in the art from a reading of the following detailed description of a preferred embodiment constructed in accordance with the invention, taken in conjunction with the accompanying drawings wherein:

FIG. 2 is an exploded view in elevation of a wheel unit and suspension as employed on the two rear drive wheels of the vehicle of FIG. 1.

FIG. 6 is a view similar to that of FIG. 5, illustrating the operation of the front steerable wheel units on a conventional crowned highway.

Figure 1:
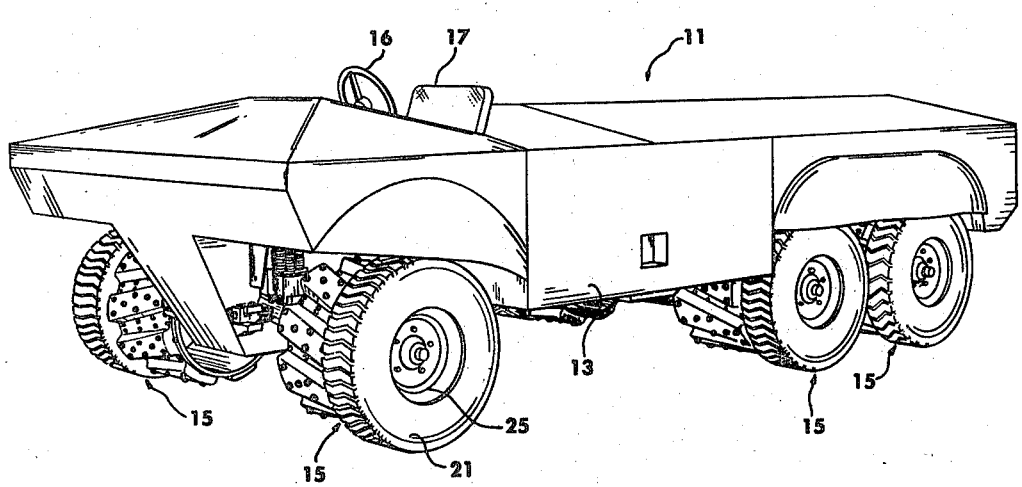
FIG. 1 is a perspective view of a vehicle incorporating the invention.

Referring now in detail to the figures of the drawings, the invention is incorporated in a vehicle 11 having a suitable body 13 which is preferably watertight and capable of flotation. As the vehicle body may be suitably formed with conventional construction techniques to effect this flotation capability, and as the present invention is not directed to the specific constructional details of this aspect, and as such is an optional construction of the vehicle and not necessary to the operation of the invention, the particular constructional details of the vehicle body are not shown herein. Also, it will be understood that the particular illustrated shape of the vehicle is for illustrative purposes only, and other configurations, including greater driver protection against gunfire, may be employed as may be desired.

The vehicle is provided with three dual wheel units 15 on each side, each being individually suspended for vertical motion through the medium of a wheel suspension generally indicated at 41 (see FIG. 2). The front pair of dual wheel units 15, 15 are suspended for both vertical and turning motion for guiding the vehicle, as by steering wheel 15 which may be controlled in a conventional manner by a driver in the driver's seat 17.

Each of the dual wheel units 15 incorporates a dual wheel arrangement, including an outer road wheel 21 and an inner off-road cross-country wheel 31. The outer road wheel 21 may be and is preferably of conventional inflated pneumatic tire construction mounted on a conventional metal wheel frame 25 (see FIG. 1). The road-engaging tread 23 of the outer road tire 21 may be of any suitable or desired configuration, a typical configuration being shown schematically in the drawings. The inner off-road wheel 31 is of substantially wider width and is of smaller diameter than the outer road wheel 21, and serves the basic purpose of providing mobility and drive for the vehicle on soft ground or other soft terrain, while being maintained out of contact with the surface of a high speed road, such as a crowned highway $G_H$, during normal operation on such hard smooth surfaces, thereby enabling smooth high speed operation of the vehicle with relative ease of steering, on high speed roadways, as compared to a configuration permitting engagement of the wider track inner wheel with the highway.

Figure 3:
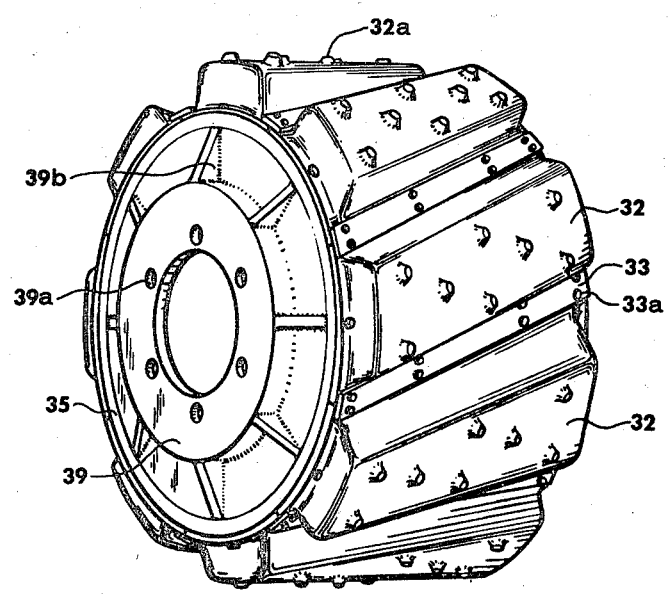
FIG. 3 is a perspective view of an inner off-road wheel of the vehicle and wheel arrangement of FIGS. 1 and 2, the illustrated off-road wheel being one as employed on the left side of the vehicle.
Figure 4:
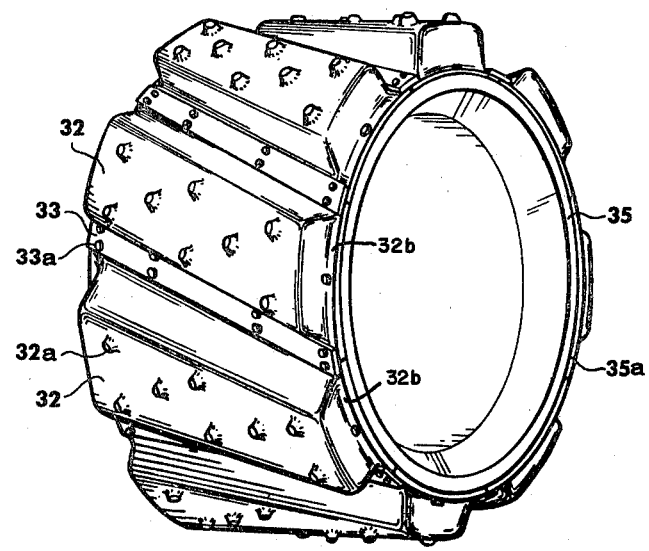
FIG. 4 is a perspective view of the off road wheel of FIG. 3 as viewed from the opposite open face.
Figure 5:
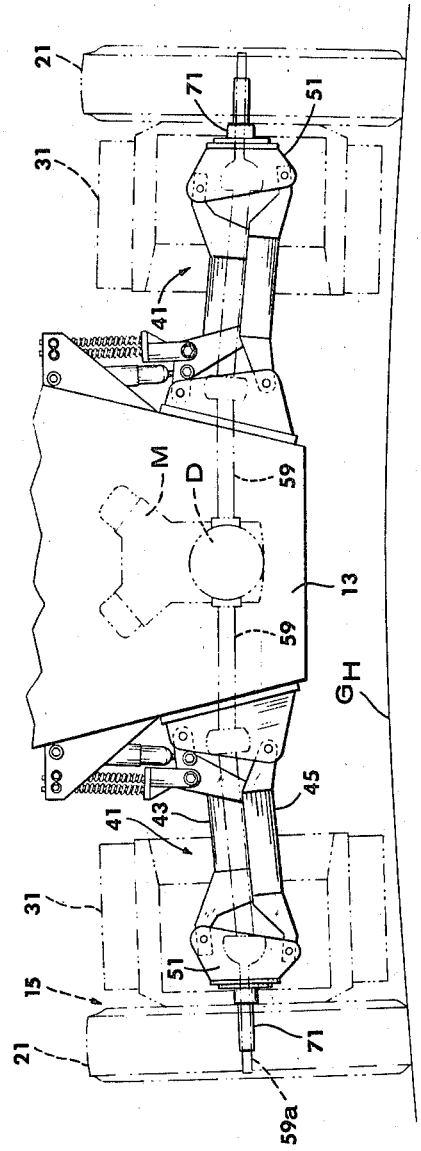
FIG. 5 is a schematic illustration of a portion of the vehicle of FIG. 1, showing the normal operation of the rear wheel units on a crowned highway.

In the illustrated and preferred embodiment the inner wheel 31 takes the form of a hollow cylindrical drum 35 (see FIG. 3) which has an outer mounting and reinforcing face flange 39 extending inwardly therefrom at its axially outer end, and with an opposite open face end 35a. The mounting and reinforcing face flange 39 incorporates reinforcing ribs 39b, and has mounting holes 39a for engagement with mounting studs 63a on a rotatable hub 61 disposed on a wheel suspension 41. The outer wheel 21 is individually removably mounted on the rotatable hub 61 as through the medium of mounting studs 65a and securing nuts 65b.

Secured to the hollow cylindrical metal drum 35 of the wheel 31 are a plurality of individual lugs 32 which are disposed in canted relation about the annular periphery of the drum 35, and secured in place as by securing screws 33a and securing plates 33 which may engage with lateral foot projections formed as by a skirt 32b extending about the base of each of the lugs 32. Preferably, the lugs are formed of hard tire grade rubber with internal fabric or cord ply reinforcement as in conventional tire construction. Also, preferably the lugs 32 are formed with a hollow cavity which is filled with cellular flexible plastic foam, to provide for reduced vulnerability to damage as from bullets while providing relatively resilient light weight off-road drive lugs. The outer peripheral surfaces of the lugs 32 are preferably formed with tapered cleats 32a integral with the rubber body of the lugs 32 which aid in providing traction for the wheel over intermediate hardness ground.

As seen in FIG. 2 the wheel suspension 41 includes a parallelogram linkage including an upper link 43 and a lower link 45, the two links 43 and 45 being pivotally pinned at their opposite ends as indicated at 47, 49, 53 and 55 for pivotal suspension between a bifurcated support bracket 57 and a bifurcated bracket 51 secured as by screws 73 to an inner fixed support hub 71 of the suspension for the wheel units 15. The upper link 43 is tubular in cross section along its intermidate length 43a, terminating at each end in pivot connection ends 43b and 43c pivotally connected at 47 and 53 as by pins to the brackets 57 and 51 respectively. The lower link 45 is half tubular along its intermediate length 45a and terminates in pivot connecting ends 45b and 45c for connection to the bifurcated body supporting bracket 57 and hub support bracket 51 as indicated at 49 and 55. The upper tubular link 43 nests within the lower half-tubular U-channel link 45, and a drive shaft 59 extends through the upper tubular length between the exit portion thereof from the body 13 and its outer splined end section 59a, as will be more fully described hereinafter.

As described above, the wheels 21 and 31 are individually removably mounted on the rotatable hub 61 carried by the wheel suspension 41, as through the medium of mounting studs 65a and 63a and securing screws 65b and 63b respectively, the wheel 21 being secured on the mounting flange 65, and the wheel 31 being secured on the mounting shoulder 63 of the rotatable hub 61. This provides for facile assembly and disassembly of the individual wheels 21, 31 of the wheel unit 15.

The rotatable mounting hub 61 may be suitably carried on the fixed supported hub 71 as by suitable bearings 79, 80, or by other suitable conventional construction, as may be desired. The rotatable mounting hub 61 with its associated wheels 21, 31 is driven by a splined connection between the splined outer end 59a of the drive shaft 59 and a complementary female splined opening formed in the axially outer end of the hub 61, the hub being axially secured to the splined end as by securing nut 81, with an end cap 83 removably secured thereover.

Suitable braking for the wheels 15 may be provided by forming a conventional brake drum 69 as an integral part of the rotatable mounting hub 61, with conventional brake shoes 69a disposed therein for operation by suitable conventional cylinders or other brake shoe operating means (not shown).

Each individual wheel suspension 41 is individually sprung as with coil spring 97 extending between the end 43c of the upper link 43 and a bracket 99 on the vehicle body 13, with suitable shock absorbers 98 being likewise provided and extending between these two members.

The wheel suspensions 41 for each of the wheel units 15 provide an upwardly and inwardly inclined axis for each of the hubs 71, 61 and wheel units 15, with engagement of only the outer road wheel 21 with a horizontal or crowned road surface, the axis of the wheel units 15 thus having what is here termed as a positive camber. This positive camber is maintained through the wide range of vertical motion which the wheel unit may undergo in the course of its travel, as indicated in broken lines in FIG. 8, and this is an important feature of the invention, as it is most desirable that the inner off-road wheel 31 be maintained off the ground during high speed travel along highways, and particularly during turning of the vehicle. While one might use a modified parallelogram linkage, such as one which would attain generally constant inter-wheel unit spacing during vertical motion, and attain suitable operation within a limited degree of vertical motion, it is preferred that the wheel suspension incorporate a substantially true parallelogram linkage for this purpose.

Each of the three pairs of wheel units 15 is driven from a common motor M carried by the vehicle body 13, as through differentials D and associated drive shafts 59. Each drive shaft 59 extends through a preferably watertight journal or packing (not shown) in the vehicle body 13, through universal joints 61 and 63 to the wheel unit 15 through the splined end connection 59a and rotatable mounting hub 61 secured on the splined end 59a of the drive shaft. The drive shaft 59 extends parallel with and within the tubular section 43a of the upper link 43 along its passage therethrough, and the universal joints 61 and 63 are disposed with their center points on the line extending between pivots 53, 55 and 47, 49 respectively, thereby insuring parallelogram operation between the upper and lower links 43, 45 and the drive shaft 59.

Figure 8:
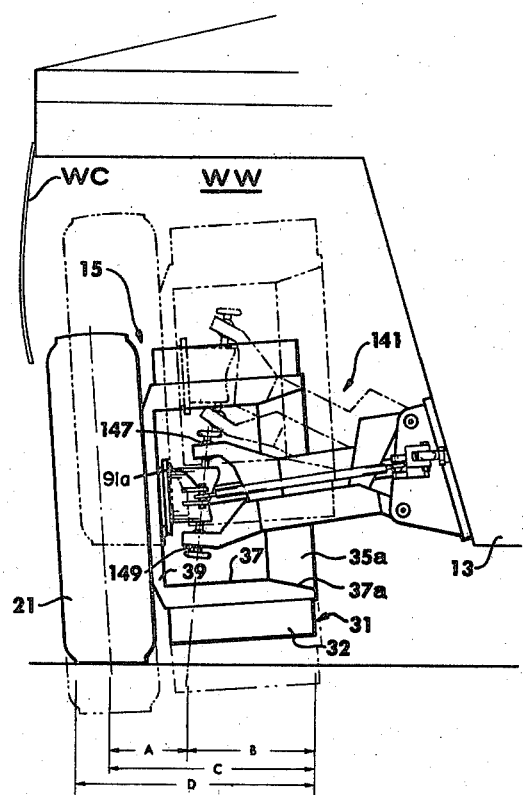
FIG. 8 is a schematic illustration of an individual unit and suspension within its wheel well on the vehicle, illustrating the vehicle motion and relative positions of the wheel units at various vertical motion positions of the wheel units.
Figure 7:
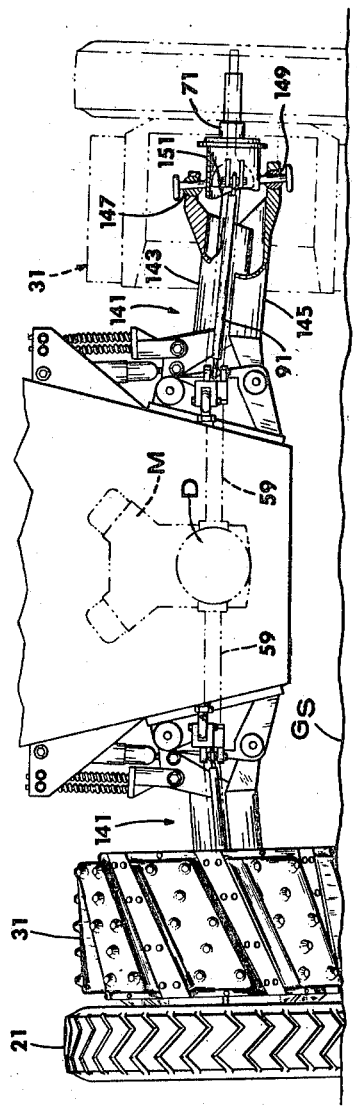
FIG. 7 is a schematic illustration of a typical disposition of the wheel units during operation of the vehicle on soft ground.

The steering of the vehicle, as by the steering wheel 15, may be accomplished through the medium of conventional tie rods 91, which may be suitably interconnected to the steering wheel through suitable mechanism which may be of conventional construction and is accordingly not herein shown. Each of the tie rods 91, as seen in FIGS. 6 and 7, is connected to a cylindrical bracket 151, which for the forward two wheel units 15, 15 takes the place of the bracket 51 of the rear wheel units. Suitable ball joints may be employed at the steering tie rod interconnections, including the interconnection 91a with the cylindrical bracket 151 which is secured to the fixed support hub 71. In lieu of the pivot pin connection 47 and 49 employed in the rear wheel suspensions, there are provided in the forward steering wheel unit suspensions ball joints 147, 149, which connect between the upper and lower links 143, 145 of the parallelogram suspension system 141 and the cylindrical bracket 151, in order to permit both vertical motion of the wheel units 15 and their associated suspensions 141, as well as turning motion about the axis extending through ball joints 147 and 149 for steering of the vehicle. It is not feasible to provide a steering connection which will be of maximum ease of use for each of the wheels 21 and 31, and accordingly a most advantageous arrangement is employed which sacrifices some ease of steering during highway operation illustrated in FIG. 6 and maintains near maximum ease of steering in soft terrain operation illustrated in FIG. 7. To this end, as illustrated in FIG. 8, the turning axis extending through ball joints 147 and 149 preferably intersects the ground line at a point where the distance A is approximately one-half the distance B, the length A being the distance between the center line of the outer wheel 21 and the ground inetrsection line with the turning axis, and the length being the distance between this ground intersection line with the turning axis and the inner edge of the inner wheel 31. Thus, the length A is approximately one-third of the distance C between the center line of wheel 21 and the inner edge of wheel 31, and the length B is approximately two-thirds of this length C, and is slightly greater than one half of the distance D extending between the generally outer and inner lines of engagement of the total wheel unit 21 when the wheel unit 21 is riding on soft ground with both wheels 21 and 31 engaged. It will be seen that while riding on a smooth highway or other even road surface the steering will require the outer road engaging wheel 21 to be steered about a radius extending from its center line to the center line of the ball joints 147, 149, and this will slightly reduce the ease of maneuverability of the vehicle during this mode of operation. However, as most difficult steering would normally be accomplished with both wheels 21 and 31 in engagement in soft ground, the center line through ball joints 147 and 149 is disposed substantially close to the middle of the zone D intersected by both wheels 21 and 31 under such operating conditions, thereby rendering this mode of steering substantially as easy as feasible, while only sacrificing to a small degree the ease of steering when the outer wheels 21 are alone in engagement with the road surface.

The rear wheels 15 and their associated suspension linkages 41 are arranged to provide similar cambered contact with the ground, the basic difference being the substitution of simple vertical motion pivots 47, 49 for the ball joints 147 and 149 of the suspension 141 of the front steering wheels. However, it will be appreciated that while the point of intersection of the center line through the pivots 47 and 49 is substantially the same as with the ball joints 147 and 149 of the front steering wheels, this point of intersection assumes less importance with the rear wheels, as the illustrated vehicle does not incorporate steering with either of the rear wheels, although such could be accomplished if so desired, through utilization of a wheel suspensions and steering arrangement similar to that as indicated at 141 and 91 for the front wheels of the illustrated vehicle.

As will be most advantageously appreciated from a view of each of FIGS. 5–8, the wheel suspensions 41 and 141 are substantially enveloped by and contained within the hollow inner wheel, and are thereby protected to a substantial extent against damage from gunfire or the like, as well as from ground obstructions. Also, it will be appreciated that the inner wheels 31 may be made even wider and extend over a larger proportion of the wheel suspensions 41 and 141, as well as the steering tie rods 91, than is shown in the illustrative drawings, the extent of coverage of the suspension being dependent upon the width of the wheel 31, and the extent of vertical motion which may be desired to be provided for the wheel unit 15, which latter factor may in turn influence the length of the suspension links 43, 45, 143, 145. As an aid to enabling utilization of a small turning radius for the steered wheel units and also in maximizing permissible vertical travel by wheel units 15 with a given smaller diameter inner wheel 31 the inner surface 37 of the cylindrical drum forming the base for the inner wheel 31 may have a flared open face end 37a, so as to reduce possible interference between the wheel 31 and the linkage 43, 45 or 143, 145, as the case may be, at the outer extent of vertical travel or turning motion of the wheel units.

When the vehicle is operated in swampy terrain, with the wheel units 15 submerged, which may sometimes occur, it is desirable that the zone between the wheel units 15 and the top of the respective wheel well WW (see FIG. 8) formed between the vehicle body and the wheel cover WC be minimized as much as feasible in order to provide as great a differential driving traction between the bottom rearwardly moving lugs 32 on the inner wheel 31 and the upper forwardly moving lugs in order to thereby propel the vehicle forward. To this end, the lugs 32 on all inner wheels 31 are canted, as viewed toward the front surface of the wheels, in a generally laterally inwardly and upwardly extending direction toward the center of the vehicle, thereby applying a laterally inwardly directed force on the mud or liquid engaging the lugs 32 in the course of forward rotation of the wheel units 15, which will result in an opposite reactive force on the wheels tending to move them and their suspension links 43, 45 and 143, 145 about their pivot connections and toward the top of the wheel well WW, thereby providing an effective differential forward driving traction between the upper and lower engaging surfaces of the wheel units 15 under such circumstances.

That which is claimed is:
1. A highway and cross-country vehicle comprising:
a vehicle body,
a pair of dual wheeled units,
each of said dual wheeled units including an axially outer wheel having a larger diameter narrow width road tire and an axially inner, relatively smaller diameter cross-country wheel of relatively substantially wider width,
and an individual wheel suspension for each of said wheel units and connecting each of said wheel units to said vehicle body on respective opposite sides of said vehicle body, the respective axes of said wheel units being disposed at a positive camber angle to the horizontal and thereby inclining said inner wheel away from the road surface so as to prevent undesired contact thereof with the surface of normally crowned highways or roads during both straight and turning vehicle travel.

2. A highway and cross-country vehicle according to claim 1,
said wheel suspensions each including cantilevered vertical motion enabling parallelogram linkage for vertical wheel unit motion while maintaining a substantially constant wheel unit camber angle.

3. A highway and cross-country vehicle according to claim 2,
said inner wheel of each of said wheel units being hollow and open at its inner end,
said suspension being disposed within and enveloped by said inner wheel, to enable disposition of said wheel units close to said vehicle body and protection of said cantilevered suspension.

4. A highway and cross-country vehicle according to claim 1,
said inner wheel of each of said wheel units being hollow and open at its inner end,
said suspension being cantilevered and disposed within and enveloped by said inner wheel, to enable disposition of said wheel units close to said vehicle body and protection of said cantilevered suspension.

5. A highway and cross-country vehicle according to claim 4,
and steering linkage including a tie rod extending within and enveloped by two interfacing ones of said hollow inner wheels and being connected in operable controlling directional relation to said wheel units.

6. A highway and cross-country vehicle according to claim 1,
said outer wheel having a pneumatic tire, and said inner wheel including a hollow cylindrical member having deep resilient canted lugs on the periphery thereof, adjacent ones of which lugs circumferentially overlap at axially opposite ends for smoother riding characteristics when in engagement with the ground.

7. A highway and cross-country vehicle according to claim 1,
and a drive shaft carried by said suspension and operatively connected to each said wheel unit, and motive means carried by said vehicle body for imparting drive energy to said drive shafts and wheel units.

8. A highway and cross-country vehicle according to claim 7,
each of said wheel unit suspensions including a tubular link and a half-tube U-channel link disposed one above the other and pivotally pinned at each end,
said drive shaft extending through said tubular link, and said tubular link nesting within the channel zone of said half-tube U-channel link.

9. A highway and cross-country vehicle according to claim 8,
and a shock absorber and spring arrangement connecting between one of said links and said body at each of said wheel unit suspensions.

10. A highway and cross-country vehicle according to claim 1,
said wheel units being removably mounted on their respective said wheel suspensions,
each of said wheels of said wheel units being individually and independently mounted and carried on their respective said suspensions.

11. A highway and cross-country vehicle comprising:
a vehicle body,
a pair of dual wheeled units,
each of said dual wheeled units including an axially outer wheel having a larger diameter narrow width road tire and an axially inner relatively smaller diameter cross-country wheel of relatively substantially wider width,
an individual wheel suspension for each of said wheel units and connecting each of said wheel units to said vehicle body on respective opposite sides of said vehicle body,
said inner wheel of each said wheel units being hollow and open at its inner end,
said suspension being disposed within and enveloped by said inner wheel, to enable disposition of said wheel units close to said vehicle body and protection of said suspensions,
and a drive shaft carried by said suspension and operatively connected to each said wheel unit, and motive means carried by said vehicle body for imparting drive energy to said drive shafts and wheel units,
each of said wheel unit suspensions including a tubular link and a half-tube U-channel link disposed one above the other and pivotally pinned at each end,
said drive shaft extending through said tubular link, and said tubular link nesting within the channel zone of said half-tube U-channel link.

12. A highway and cross-country vehicle comprising:
a vehicle body,
a pair of dual wheeled units,
each of said dual wheeled units including an axially outer wheel having a larger diameter narrow width road tire and an axially inner relatively smaller diameter cross-country wheel of relatively substantially wider width,
and a pivoted linkage vertical motion wheel unit suspension for each of said wheel units and connecting each of said wheel units to said vehicle body on respective opposite sides of said vehicle body,
said vehicle body having wheel wells for said wheels and well covers over the outer upper zone of said wells,
said inner wheel having deep canted lugs formed on the circumferential periphery thereof for engagement with soft cross-country terrain, the cant of said lugs being in one angular direction on the wheel units on one side of said vehicle body and being of opposite angular direction on the opposite side wheel units,
said cant being upwardly and inwardly directed as viewed on the front circumferential face of each of said inner wheels of said wheel units, to thereby impart upward torque on said wheel units along their axes and about said pivoted linkage vertical motion wheel unit suspensions as a function of forward rotation of said wheel units, whereby to aid in propulsion of said vehicle through swamp areas in which said wheel units may be enveloped by mud or liquid, through reduction of the wheel well clearance zone above each said wheel unit as a function of upward pivoted motion of said wheel units through action of said torque thereon, and thereby increasing the forward drive effectiveness of the lower exposed inner wheel surface.

13. A highway and cross-country vehicle according to claim 12, said lugs being resilient and foam-filled.

References Cited

UNITED STATES PATENTS

| | | | |
|---|---|---|---|
| 2,336,959 | 12/1943 | Redman | 301—38 |
| 2,375,670 | 5/1945 | MacPherson | 180—24 |
| 3,266,591 | 8/1966 | Sampietro et al. | 180—44 X |
| 3,283,842 | 11/1966 | Watt | 180—48 |

FOREIGN PATENTS

| | | |
|---|---|---|
| 14,590 | 4/1934 | Australia. |
| 119,310 | 12/1944 | Australia. |
| 260,190 | 1928 | Italy. |
| 377,450 | 7/1932 | Great Britain. |

A. HARRY LEVY, Primary Examiner

U.S. Cl. X.R.

115—1; 180—24; 280—96.3; 301—36, 38